US007013879B2

(12) United States Patent
Brookshire et al.

(10) Patent No.: US 7,013,879 B2
(45) Date of Patent: Mar. 21, 2006

(54) DUAL AND HYBRID EGR SYSTEMS FOR USE WITH TURBOCHARGED ENGINE

(75) Inventors: Dennis Brookshire, Novi, MI (US); Steven Don Arnold, Rancho Palos Verdes, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/714,426

(22) Filed: Nov. 17, 2003

(65) Prior Publication Data

US 2005/0103013 A1 May 19, 2005

(51) Int. Cl.
F02M 25/07 (2006.01)
(52) U.S. Cl. .............................. 123/568.12; 123/568.2; 60/605.2
(58) Field of Classification Search ........... 123/568.11, 123/568.12, 568.19, 568.2; 60/599, 605.2, 60/612, 602
See application file for complete search history.

(56) References Cited

U.S. PATENT DOCUMENTS

| 4,215,550 | A |   | 8/1980  | Dinger et al.          |
|-----------|---|---|---------|------------------------|
| 4,756,285 | A | * | 7/1988  | Pischinger ..... 60/605.2 |
| 5,025,629 | A |   | 6/1991  | Woollenweber           |
| 5,131,229 | A |   | 7/1992  | Kriegler et al.        |
| 5,142,866 | A |   | 9/1992  | Yanagihara et al.      |
| 5,203,311 | A |   | 4/1993  | Hitomi et al.          |
| 5,611,202 | A | * | 3/1997  | Sumser et al. ..... 60/605.2 |
| 5,617,726 | A |   | 4/1997  | Sheridan et al.        |
| 5,740,785 | A |   | 4/1998  | Dickey et al.          |
| 5,771,868 | A |   | 6/1998  | Khair                  |
| 5,806,308 | A |   | 9/1998  | Khiar et al.           |
| 5,927,075 | A |   | 7/1999  | Khair                  |
| 5,937,650 | A |   | 8/1999  | Arnold                 |
| 5,937,651 | A |   | 8/1999  | Braun                  |
| 6,003,316 | A |   | 12/1999 | Baert et al.           |
| 6,062,026 | A |   | 5/2000  | Woollenweber et al.    |
| 6,062,028 | A |   | 5/2000  | Arnold et al.          |
| 6,138,649 | A |   | 10/2000 | Khair et al.           |
| 6,216,458 | B1|   | 4/2001  | Alger et al.           |
| 6,244,256 | B1|   | 6/2001  | Wall et al.            |
| 6,269,642 | B1|   | 8/2001  | Arnold                 |
| 6,286,312 | B1|   | 9/2001  | Bertilsson             |

(Continued)

FOREIGN PATENT DOCUMENTS

DE 019514572 A1 10/1996

(Continued)

OTHER PUBLICATIONS

U.S. Appl. No. 10/618,515, filed Jul. 11, 2003, Vrbas et al.

(Continued)

*Primary Examiner*—Willis R. Wolfe, Jr.
(74) *Attorney, Agent, or Firm*—Chris James

(57) ABSTRACT

EGR systems for an internal combustion engine configured to operate using multiple-staged turbochargers, or a pair of single stage turbochargers, to provide exhaust gas recirculation to meet emissions requirements while not affecting engine performance. One or two EGR loops operating at low, intermediate, or high pressures may be employed. EGR exhaust gases may be taken directly from the exhaust manifold, or after the exhaust stream has passed through a turbocharger turbine. EGR exhaust gases may be injected at an intermediate pressure between stages of a multiple stage turbocharger, or alternatively between a low pressure turbocharger compressor and high pressure turbocharger compressor, before being boosted to a pressure high enough to ensure the desired mass flow to the engine and delivered to the intake manifold. Intake air may be pressurized prior to mixing with the EGR exhaust gases.

23 Claims, 14 Drawing Sheets

U.S. PATENT DOCUMENTS

| | | |
|---|---|---|
| 6,286,489 B1 | 9/2001 | Bailey |
| 6,301,887 B1 | 10/2001 | Gorel et al. |
| 6,301,888 B1 | 10/2001 | Gray, Jr. |
| 6,338,245 B1 | 1/2002 | Shimoda et al. |
| 6,354,084 B1 | 3/2002 | McKinley et al. |
| 6,360,541 B1 | 3/2002 | Waszkiewicz et al. |
| 6,378,307 B1 | 4/2002 | Fledersbacher et al. |
| 6,378,308 B1 | 4/2002 | Pfluger |
| 6,386,154 B1 | 5/2002 | Hellman et al. |
| 6,422,220 B1 | 7/2002 | Lepp et al. |
| 6,470,864 B1 | 10/2002 | Kim et al. |
| 6,484,500 B1 | 11/2002 | Coleman et al. |
| 6,564,784 B1 | 5/2003 | Onodera et al. |
| 6,722,129 B1 * | 4/2004 | Criddle et al. .............. 60/605.2 |
| 6,742,506 B1 | 6/2004 | Grandin |
| 2001/0017033 A1 | 8/2001 | McKinley et al. |
| 2001/0035171 A1 | 11/2001 | Kim et al. |
| 2001/0052341 A1 | 12/2001 | Sasaki et al. |
| 2001/0054416 A1 | 12/2001 | Yoshizaki et al. |
| 2002/0026926 A1 | 3/2002 | Loye et al. |
| 2002/0073979 A1 | 6/2002 | Lepp et al. |
| 2002/0112478 A1 | 8/2002 | Pfluger |
| 2003/0093994 A1 | 5/2003 | Bailey |
| 2003/0145591 A1 | 8/2003 | Arnold |
| 2004/0050375 A1 * | 3/2004 | Arnold .................. 123/568.12 |
| 2004/0093866 A1 * | 5/2004 | Ishikawa ................... 60/605.2 |
| 2005/0056017 A1 * | 3/2005 | Sisken et al. .............. 60/605.2 |

FOREIGN PATENT DOCUMENTS

| | | |
|---|---|---|
| DE | 19943131 A1 | 3/2000 |
| EP | 0718481 A2 | 6/1996 |
| EP | 1186767 A2 | 3/2002 |
| JP | 2001-079266 | 9/2002 |

OTHER PUBLICATIONS

U.S. Appl. No. 10/430,466, filed May 5, 2003, Arnold et al.

* cited by examiner

DUAL AND HYBRID EGR SYSTEMS FOR USE WITH TURBOCHARGED ENGINE

CROSS-REFERENCE TO RELATED APPLICATIONS

This application claims the benefit of the filing of U.S. Provisional Patent Application Ser. No. 60/425,933 entitled "Dual and Hybrid EGR Systems for Use With Turbocharged Engines", filed on Nov. 13, 2002, and the specification thereof is incorporated herein by reference.

BACKGROUND OF THE INVENTION

1. Field of the Invention (Technical Field)

The present invention relates generally to the field of gasoline and diesel-powered internal combustion engines that make use of exhaust gas recirculation (EGR) systems and, more particularly, to dual and hybrid EGR systems that are specially adapted for use with turbocharged internal combustion engines.

2. Description of Related Art

EGR is a known method that is currently employed with internal combustion gasoline and diesel-powered engines for reducing NOx emissions. Conventional EGR systems work by taking a by-pass stream of engine exhaust gas from an engine exhaust manifold and directing the same to a control valve or an EGR valve. The EGR valve is designed and operated to provide a desired amount of exhaust gas for mixture with intake air and injection into the engine's induction system for subsequent combustion. The EGR valve regulates the amount of exhaust gas that is routed to the engine induction system based on engine demand.

The process of recirculating the exhaust gas insures that partially-oxidized NOx becomes fully oxidized, thereby reducing smog producing partially-oxidized NOx emissions. Accordingly, such convention EGR systems include exhaust by-pass tubing or piping, related plumbing and manifolding, and engine driven EGR pump (if further pressurizing is necessary), and an EGR control valve, all of which are ancillary components that are attached to the engine.

While such conventional EGR systems may be sufficient for meeting today's emissions regulations for certain application, future emission requirements will be more stringent and the current state of the EGR technology will not be able to meet such requirements. For example, starting in the year 2007, medium and heavy-duty on-highway diesel emissions regulations will require that the amount of nitrogen oxide gases (collectively known as NOx) emitted be reduced by an order of magnitude (10×). Such reduction in emissions may possibly be achieved via EGR and/or by exhaust gas aftertreatment.

When looking at turbocharged engine applications, such as in the case of a turbocharged diesel-powered engine, the use of these combined methods make it more difficult than ever to match the turbocharger operation to provide optimum engine performance while still maintaining the ability to provide sufficient EGR driving (i.e., negative engine $\Delta P$) capability.

It is, therefore, desired that an improved EGR system be provided in a manner that is adapted for use in turbocharged engine applications to provide the same or improved engine performance characteristics, when compared to conventional EGR systems, while also meeting the increasingly stringent emission requirements described above.

BRIEF SUMMARY OF THE INVENTION

The present invention is of an exhaust gas recirculation (EGR) system comprising an engine having an intake manifold and an exhaust manifold; a turbocharger with at least one compressor stage; a first exhaust gas bypass stream connected to receive exhaust gas upstream of the turbocharger; a first control valve connected in the first exhaust gas bypass stream to control the amount of exhaust gas received from the exhaust manifold; a second exhaust gas bypass stream connected to receive exhaust gas exiting the exhaust manifold through a turbine section of the turbocharger and combine the gas with an intake air stream to form an exhaust gas/air mixture that is directed into a first compressor stage of the turbocharger; and a second control valve connected within the second exhaust gas bypass stream upstream of a connection point with the intake air stream for controlling a relative amount of air and exhaust gas in the exhaust gas/air mixture routed to the first compressor stage of the turbocharger.

The exhaust gas from the first exhaust gas bypass stream may be cooled with an EGR cooler and mixed with the exhaust gas/air mixture to form a final gas/air mixture before the final gas/air mixture is directed into a second compressor stage of the turbocharger, before the pressurized final gas/air mixture is introduced into the intake manifold. The exhaust gas/air mixture may be cooled after it is compressed by the first compressor stage. A diesel particulate filter to filter exhaust gas in the first exhaust gas bypass stream may be added. Optionally the pressurized exhaust gas/air mixture exiting a last compressor stage of the turbocharger is combined with the first exhaust gas bypass stream before being introduced into the intake manifold, with the exhaust gas/air mixture optionally being cooled before entering the last compressor stage.

At least one EGR cooler may be used to cool the first exhaust gas bypass stream and/or the second exhaust gas bypass stream. A charge air cooler may be employed to cool the pressurized exhaust gas and air before they are introduced into the intake manifold. At least one exhaust aftertreatment to treat the second exhaust gas bypass stream is optionally included.

This EGR system may optionally comprise a second turbocharger operated in parallel with the turbocharger; a bypass for directing a partial flow of exhaust exiting the exhaust manifold into an inlet of a turbine section of the second turbocharger and a first synchronized control valve to control said partial flow; and a second synchronized control valve to control a relative amount of exhaust gas/air mixture entering compressor sections of the turbochargers; wherein exhaust gas exiting the turbine section of the second turbocharger forms a part of the second exhaust gas bypass stream.

The present invention is also of an EGR system comprising an engine having an intake manifold and an exhaust manifold a pair of serially arranged turbochargers; a first exhaust gas bypass stream connected to receive exhaust gas upstream of a first turbocharger; a first control valve connected in the first exhaust gas bypass stream to control the amount of exhaust gas received from the exhaust manifold; a second exhaust gas bypass stream connected to receive exhaust gas exiting the exhaust manifold through a turbine section of at least one turbocharger and combine the gas with an intake air stream to form an exhaust gas/air mixture that is directed into a compressor section of the second turbocharger; and a second control valve connected within the second exhaust gas bypass stream upstream of a connection point with the intake air stream for controlling a relative amount of air and exhaust gas in the exhaust gas/air mixture routed to the compressor section of the second turbocharger; wherein the pressurized exhaust gas/air mixture exiting the second turbocharger is directed to an inlet of a compressor section of the first turbocharger for further compression.

Optionally a turbine section of the second turbocharger receives exhaust gas exiting a turbine section of the first turbocharger and the second exhaust gas bypass stream is connected to receive exhaust gas exiting the turbine section of the second turbocharger, optionally wherein the exhaust gas from the first exhaust gas bypass stream is cooled and mixed with the exhaust gas/air mixture before said mixture is directed to an inlet of a compressor section of the first turbocharger to form a final gas/air mixture, and wherein the pressurized final gas/air mixture exiting the compressor section of the first turbocharger is introduced into the intake manifold. The system may optionally further comprise a diesel particulate filter to filter exhaust gas in the first exhaust gas bypass stream.

Alternatively, the pressurized exhaust gas/air mixture exiting the compressor section of the first turbocharger is combined with the first exhaust gas bypass stream before being introduced into the intake manifold. An EGR cooler may be used to cool the first exhaust gas bypass stream.

In an alternative embodiment the second exhaust gas bypass stream is connected to receive exhaust gas exiting a turbine section of the first turbocharger, wherein the exhaust gas from the first exhaust gas bypass stream is cooled and mixed with the exhaust gas/air mixture before said mixture is directed to a compressor section of the first turbocharger to form a final gas/air mixture, and wherein the pressurized final gas/air mixture exiting the compressor section of the first turbocharger is introduced into the intake manifold. A diesel particulate filter to filter exhaust gas in the first exhaust gas bypass stream may optionally be employed.

These embodiments may further comprise a charge air cooler to cool the exhaust gas and air before they are introduced into the intake manifold, an EGR cooler to cool the second exhaust gas bypass stream, at least one exhaust after-treatment to treat the second exhaust gas bypass stream, and/or a charge air cooler to cool the exhaust gas/air mixture after it is compressed by the compressor section of the second turbocharger.

The present invention is further of an EGR system comprising an engine having an intake manifold and an exhaust manifold; two turbochargers; an exhaust gas bypass stream; a control valve connected in the exhaust gas bypass stream to control the amount of exhaust gas received from the exhaust manifold; and a cooler to cool the exhaust gas; wherein said exhaust gas is mixed with intake air to form an exhaust gas/air mixture and the exhaust gas/air mixture is compressed by a compressor section of the first turbocharger before being directed to the intake manifold.

The exhaust gas bypass stream may be configured to receive exhaust gas downstream of a turbine section of the first turbocharger, wherein the exhaust gas/air mixture compressed by a compressor section of the second turbocharger before being compressed by the compressor section of the first turbocharger, or alternatively wherein the intake air is compressed by a compressor section of the second turbocharger before it is mixed with the exhaust gas. The intake air may optionally be cooled after it is compressed by the compressor section of the second turbocharger.

Alternatively the exhaust gas bypass stream is configured to receive exhaust gas upstream of the turbochargers, wherein the intake air preferably is compressed by a compressor section of the second turbocharger before it is mixed with the exhaust gas, and the intake air is optionally cooled after it is compressed by the compressor section of the second turbocharger.

These embodiments may further comprise a diesel particulate filter upstream of the control valve and/or a charge air cooler to cool the pressurized exhaust gas/air mixture before it is introduced into the intake manifold.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

EGR systems of this invention are configured to operate with single or multiple-turbocharged internal combustion engine applications, using single or multiple-staged turbochargers, to provide exhaust gas recirculation to the engine in a manner that meets stringent emissions requirements without detracting from desired engine performance characteristics.

To be able to meet desired performance requirements with a multi-staged turbine and/or compressor, the locations for tapping off the EGR from the exhaust and introducing it back into the intake system is of major significance. Thus, the flexibility in being able to tap off exhaust gas and introduce it back into the intake flow at multiple locations may be required. This includes tapping off exhaust gases in between stages and not necessarily at the exhaust manifold (High Pressure Loop EGR) or tailpipe (Low Pressure Loop EGR). Tapping off and introducing exhaust gases between stages for EGR purposes is referred to herein as "Hybrid" EGR Systems. In all cases, if EGR is being introduced upstream of a compressor and vehicle Charge Air Cooler (CAC), then it is likely that a particulate filter will be required to rid the exhaust of the constituents that would likely foul the compressor and/or vehicle CAC.

EGR systems of this invention are described and illustrated as being used in conjunction with exhaust after-treatments for the purpose of achieving reduced NOx emissions, which can be provided in the form of filters, catalysts and/or traps. Examples of such exhaust after-treatments can include lean NOx traps (LNT), diesel oxidation catalysts (DOC), and diesel particular filters (DPF). However, it is to be understood that EGR systems of this invention can alternatively be used without exhaust after-treatments, or can be used with exhaust after-treatments other than those noted above without departing from the spirit of this invention.

Figure 1:
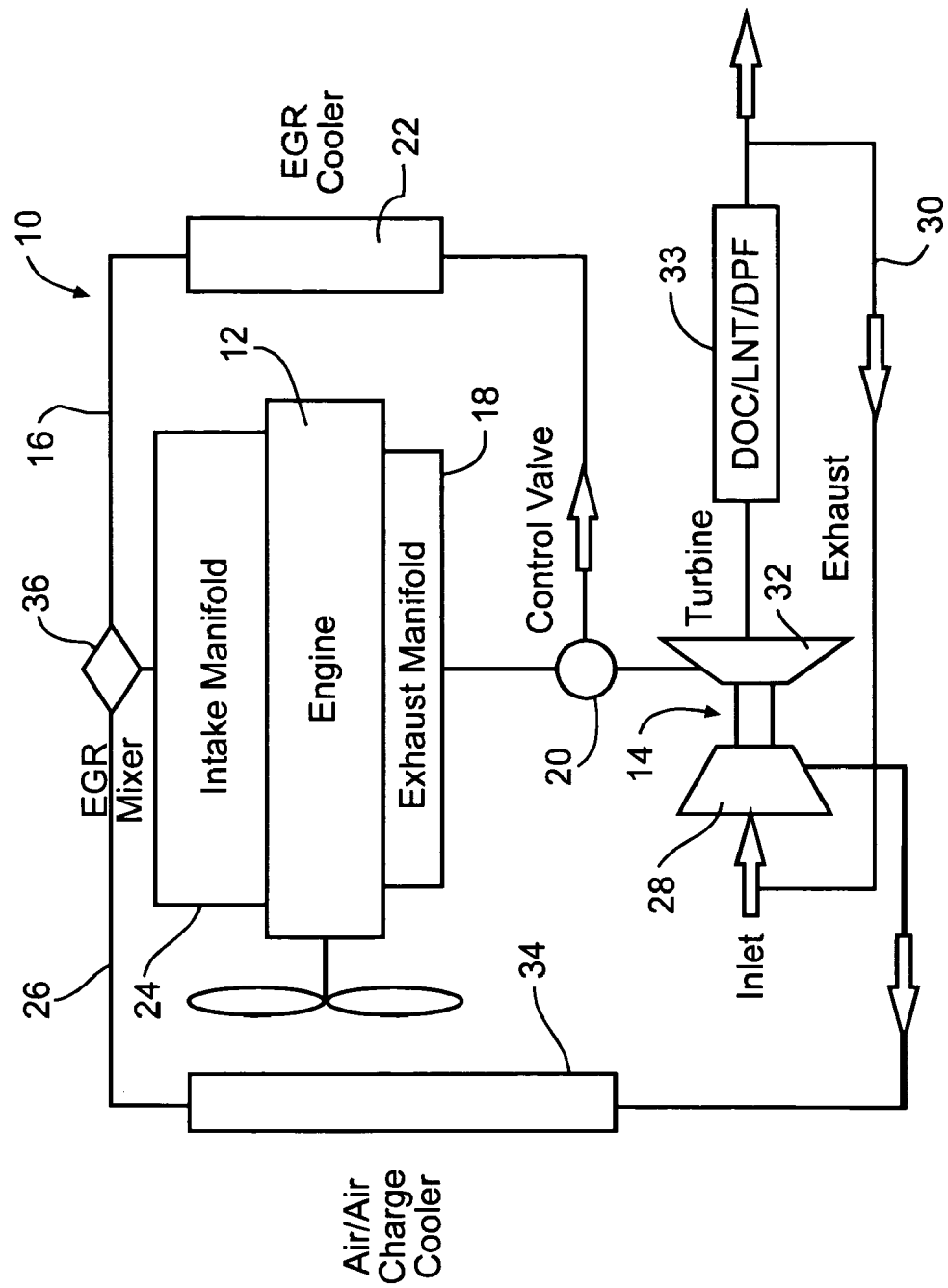
FIG. 1 is a schematic diagram illustrating a first embodiment dual EGR system according to principles of the invention.

FIG. 1 illustrates a first embodiment dual EGR system 10 of this invention comprising engine 12 and turbocharger 14 connected thereto. In the example illustrated, the engine 12 is of an inline piston configuration, however EGR system 10 will work with any engine configuration. As used herein, the term "dual" is understood to refer to the fact that two EGR streams are being provided to the engine. First EGR stream 16 is provided from engine exhaust manifold 18 and is controlled via control or EGR valve 20. Cooler 22 is used to cool the first EGR stream before introduced into engine intake manifold 24. Exhaust gas from a second EGR stream is mixed with intake air and pressurized by turbocharger compressor 28. The exhaust gas for the second EGR stream is provided to an inlet end of the compressor via exhaust bypass stream 30 exiting the turbocharger turbine 32. The exhaust bypass is taken downstream of exhaust after-treatment 33, and air-to-air charge cooler 34 is used to cool pressurized fresh air/second EGR stream mixture 26 before introduction into the intake manifold. EGR mixer 36 is used to mix the first and second EGR streams together prior to introduction.

In this particular embodiment, fresh air/second EGR stream mixture 26 is a high pressure loop (HPL) that is cooled to provide EGR for mid/full load operation. First EGR stream 16 is a low pressure loop (LP) that provides uncooled EGR for idle/low load operation. The spilt between EGR delivered via the HPL and LP is controlled by EGR valve 20, and the split towards the LP is increased for cold weather operation.

Figure 2:
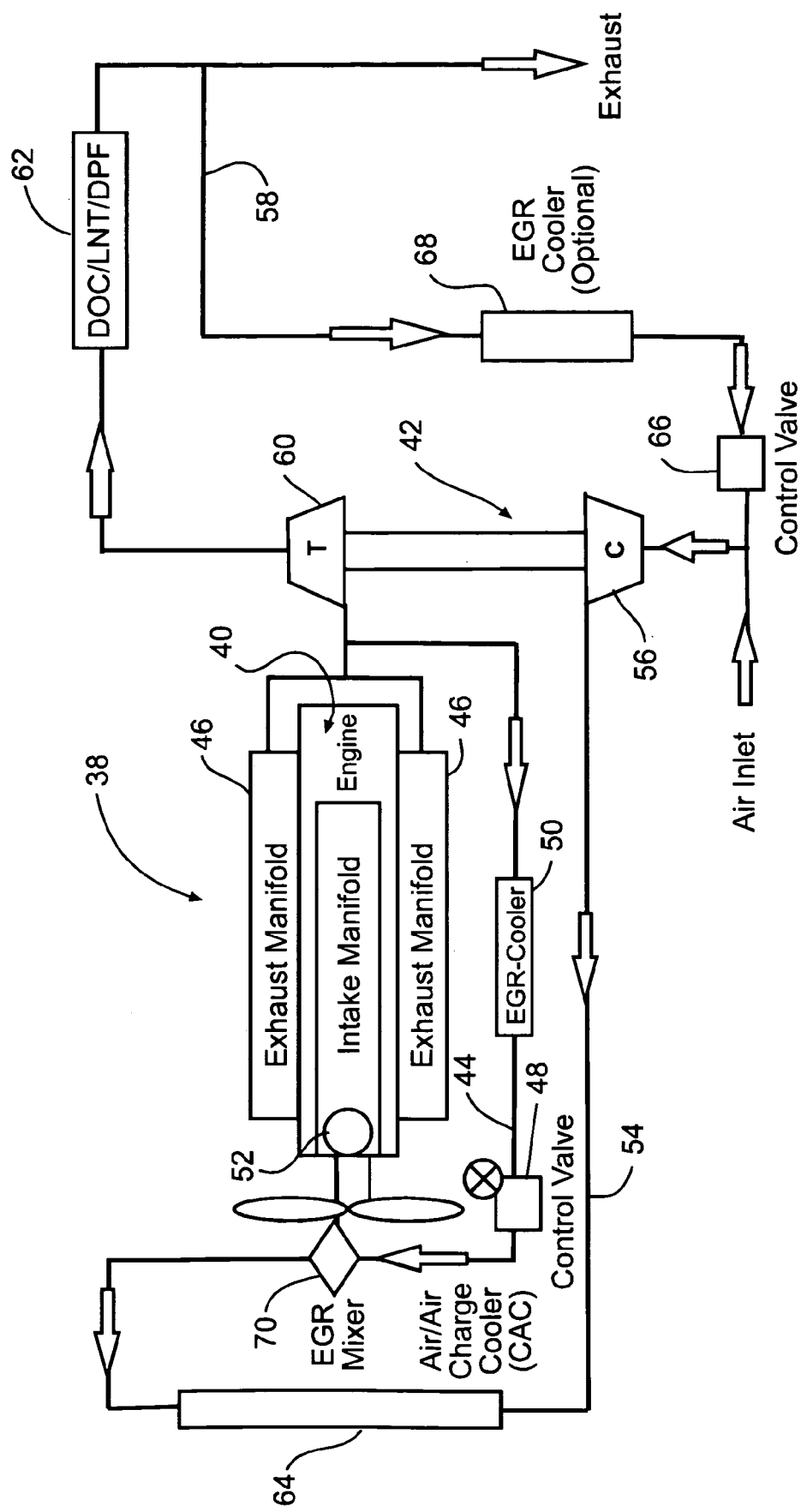
FIG. 2 is a schematic diagram illustrating a second embodiment dual EGR system according to principles of the invention.

FIG. 2 illustrates a second embodiment dual EGR system 38 of this invention comprising engine 40 and turbocharger 42 connected thereto. In the example illustrated, engine 40 is of a V-8 piston configuration, however EGR system 38 will work with any engine configuration. First EGR stream/LP 44 is provided from engine exhaust manifolds 46 and is controlled via first control or EGR valve 48. Cooler 50 is used to cool the first EGR stream before introduced into engine intake manifold 52. Second EGR stream/HPL 54 is provided with pressurized intake air provided by turbocharger compressor 56. The exhaust gas for the second EGR stream is provided to an inlet end of the compressor via exhaust bypass stream 58 exiting turbocharger turbine 60. The exhaust bypass is taken downstream of exhaust aftertreatment 62, and air-to-air charge cooler 64 is used to cool the pressurized intake air and second EGR stream before introduction into the intake manifold. Second control or EGR valve 66 can be used to control the amount of exhaust gas that is mixed with fresh intake air for introduction into the compressor inlet. Second cooler 68 may optionally be used in exhaust bypass 58 to control the temperature of the exhaust gas entering the compressor. EGR mixer 70 is used to mix the first and second EGR streams together prior to introduction into the engine.

In this particular embodiment, the first/LP and second/HPL EGR streams are operated in the same manner as described above to provide cooled EGR for mid/full load operation, and uncooled EGR for idle/low load operation.

Figure 3:
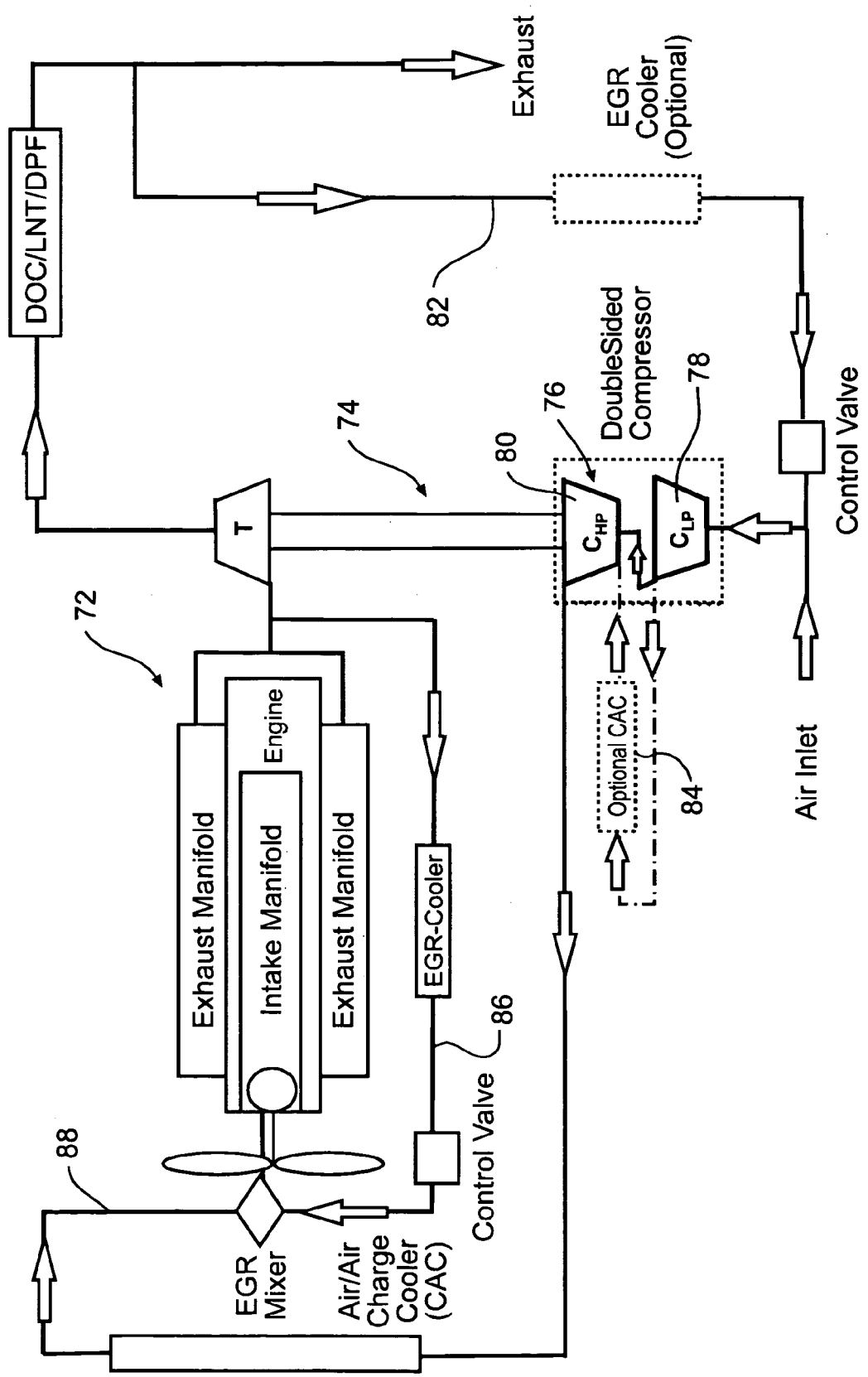
FIG. 3 is a schematic diagram illustrating a third embodiment dual EGR system, used with a turbocharger comprising a two-stage compressor, according to principles of the invention.

FIG. 3 illustrates a third embodiment dual EGR system 72 that is in many respects similar to that described above and illustrated in FIG. 2, except that the turbocharger 74 includes a compressor section 76 comprising a double sided or two-stage compressor. First compressor 78 is a low pressure compressor that receives a mix of intake air and EGR from exhaust bypass 82 and pressurizes the same before routing to second compressor 80 that is a high pressure compressor and that operates to provide a final desired boosting pressure for introduction of the mixed intake air and EGR into the engine. Charge air cooler 84 may optionally be used between the first and second compressor stages. Like the embodiment illustrated in FIG. 2, first/LP 86 and second/HPL EGR streams 88 are operated to provide desired cooled EGR for mid/full load operation, and uncooled EGR for idle/low load operation.

Figure 4:
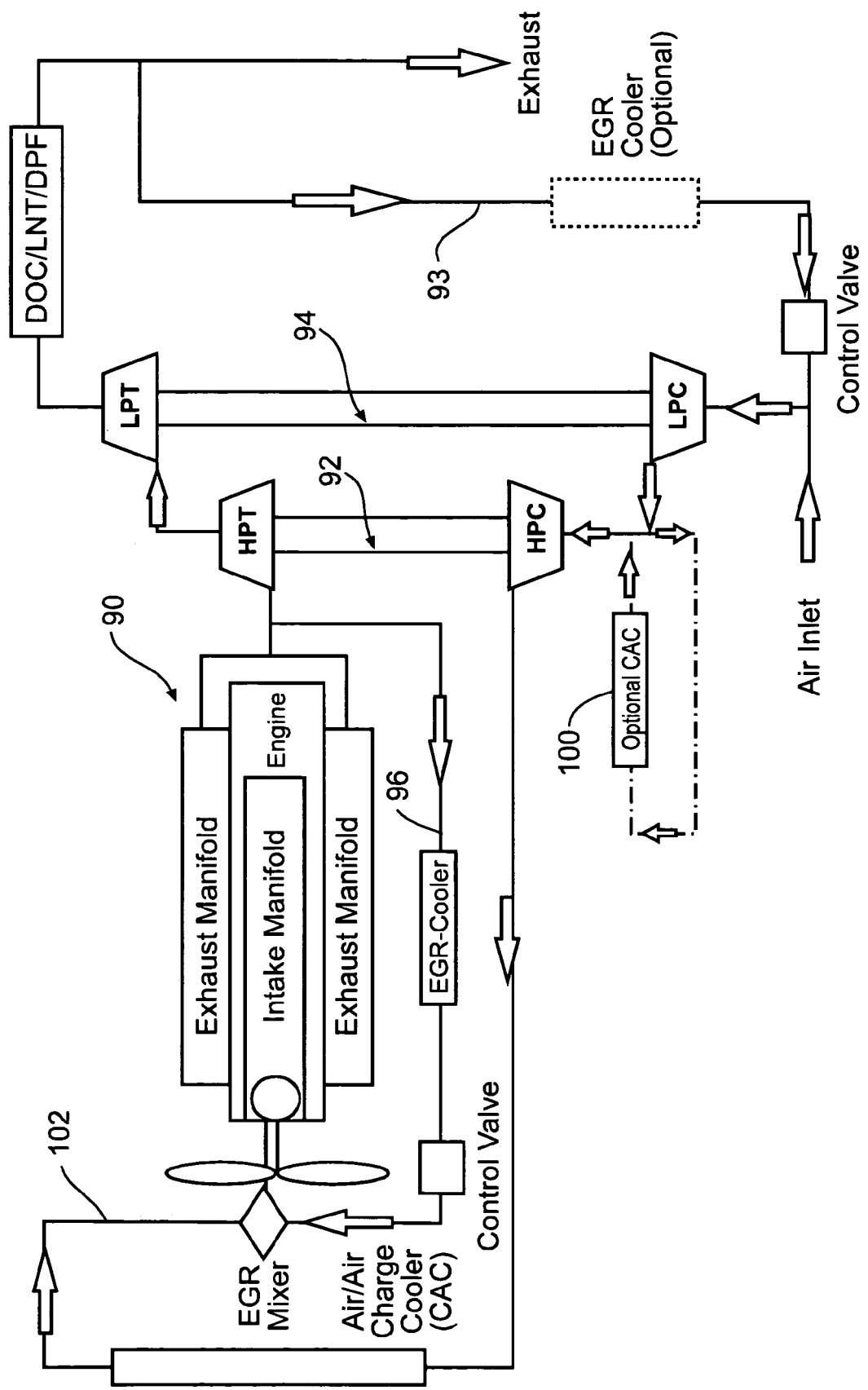
FIG. 4 is a schematic diagram illustrating a fourth embodiment dual EGR system, used with turbochargers operated in a serial arrangement, according to principles of the invention.

FIG. 4 illustrates a fourth embodiment dual EGR system 90 that is in many respects similar to that described above and illustrated in FIG. 2, except that the engine is turbocharged by more than one turbocharger. In this example, two turbochargers 92 and 94 are arranged in series. First EGR stream/LP 96 is the same as that of the second and third embodiments. The exhaust gas outlet from first turbocharger 92 is directed to the turbine inlet of second turbocharger 94, and exhaust bypass 93 is mixed with fresh inlet air prior to entering the low pressure compressor of second turbocharger 94. The pressurized output from the low pressure compressor is directed to a high pressure compressor of first turbocharger 92, and optional charge air cooler 100 can be interposed therebetween. The mix of pressurized air and EGR exiting the high pressure compressor comprises second EGR stream/HPL 102 of the system. Like the dual EGR system embodiments described and illustrated above, first/LP 96 and second/HPL 102 EGR streams are operated to provide desired cooled EGR for mid/full load operation, and uncooled EGR for idle/low load operation.

Figure 5:
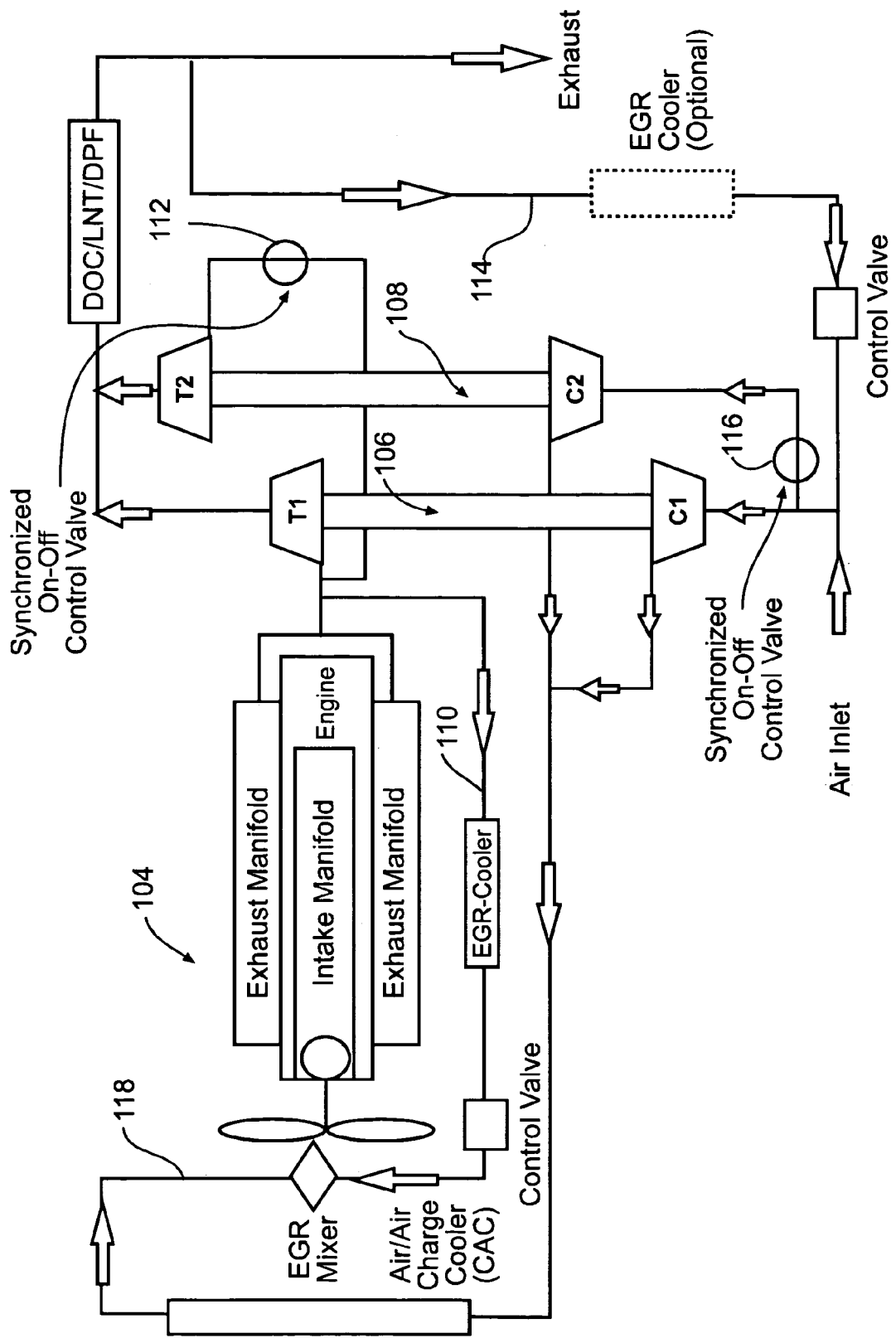
FIG. 5 is a schematic diagram illustrating a fifth embodiment dual EGR system, used with turbochargers operated in a parallel sequential arrangement, according to principles of the invention.

FIG. 5 illustrates a fifth embodiment dual EGR system 90 that is in many respects similar to that described above and illustrated in FIG. 2, except that the engine is turbocharged by more than one turbocharger. In this example, two turbochargers 106 and 108 are arranged in parallel. First EGR stream/LP 110 is the same as that of the second, third and fourth embodiments. The exhaust gas outlet from the exhaust manifold, which is connected to the turbine inlet of first turbocharger 106, includes a bypass that is connected via control valve 112 to the turbine inlet of second turbocharger 108 to permit second turbocharger operation if so desired. Exhaust bypass 114 is taken from the outlet of both turbochargers and is mixed with fresh inlet air prior to entering one or both compressor inlets of the two turbochargers. Second control valve 116 is used to permit the parallel passage of inlet air and EGR to the second turbocharger. The pressurized air and EGR exiting both turbochargers is directed towards the engine and comprises second EGR stream/HPL 118 of the system. Unlike the fourth dual EGR system embodiment, there are no intermediate pressure areas between the turbochargers, as each of the turbochargers are operated in parallel not in series. However, like the dual EGR system embodiments described and illustrated above, first/LP 110 and second/HPL 118 EGR streams are operated in the same manner as that previously described to provide desired cooled EGR for mid/full load operation, and uncooled EGR for idle/low load operation.

Figure 6:
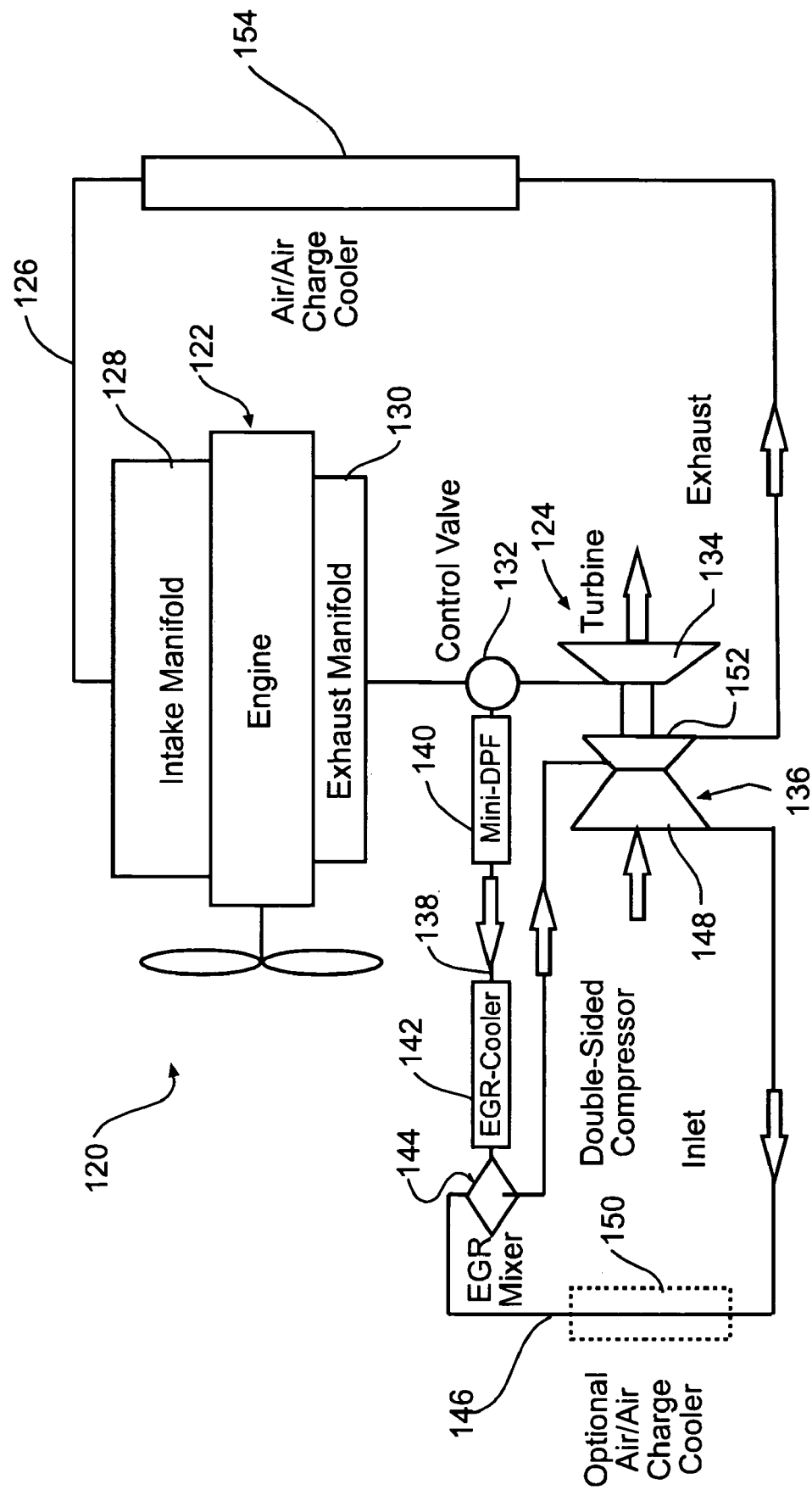
FIG. 6 is a schematic diagram illustrating a first embodiment hybrid EGR system, used with a turbocharger comprising a two-stage compressor, according to principles of the invention.

FIG. 6 illustrates a first embodiment hybrid EGR system 120 of this invention comprising engine 122 and turbocharger 124 connected thereto. In the example illustrated, engine 122 is of an inline piston configuration, however hybrid EGR system 120 may be used with any engine configuration. As used herein, the term "hybrid" is understood to refer to the fact that an exhaust bypass stream is taken from the engine and introduced between compressor stages of a turbocharger comprising two stages. In this embodiment, a single EGR stream 126 is introduced into engine intake manifold 128. Exhaust gas exiting engine exhaust manifold 130 is passed to control valve 132. The valve directs the passage of exhaust gas to one or both of turbocharger turbine 134 and turbocharger compressor 136. Bypass stream 138 that is routed to the compressor 136 can first be passed through exhaust after-treatment 140, e.g., diesel particular filtering, for purposes of not fouling the compressor or downstream charge air cooler. The EGR stream is then cooled by passage through EGR cooler 142 before being mixed via EGR mixer 144 with pressurized intake air 146 produced by compressor first stage 148. Optionally charge air cooler 150 may be used to cool the first stage pressurized air. The combined exhaust gas and pressurized air mixed in mixer 144 is introduced to the inlet of compressor second stage 152 for further pressurizing before being directed to the engine. Charge air cooler 154 is used to cool the pressurized air and EGR stream 126 prior to introduction into the engine. The embodiment illustrated is that of a low speed turbocharger configuration. In this particular embodiment, EGR stream 126 is provided in the form of pressurized intake air mixture and the amount of EGR is controlled by control valve 132.

Figure 7:
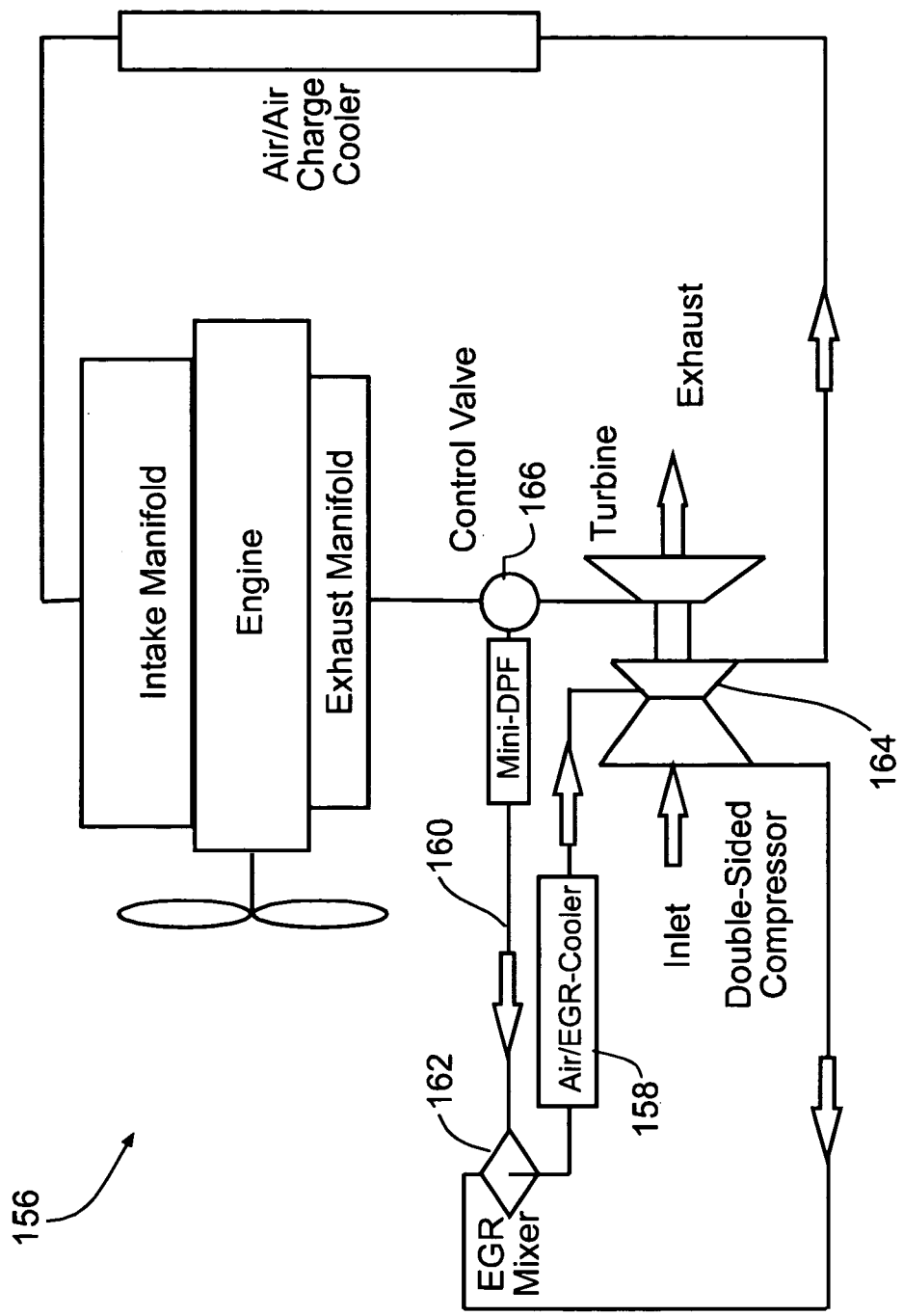
FIG. 7 is a schematic diagram illustrating a second embodiment hybrid EGR system, used with a turbocharger comprising a two-stage compressor, according to principles of the invention.

FIG. 7 illustrates a second embodiment hybrid EGR system 156 of this invention that is in many respects similar to that described above and illustrated in FIG. 6, except that EGR cooler 158 is disposed within exhaust bypass stream 160 downstream from EGR mixer 162 so that it operates to cool both the exhaust gas and first stage pressurized intake air before being introduced into turbocharger second compressor stage 164. Like the hybrid EGR system embodiment described above, control valve 166 operates to regulate the amount of exhaust gas that is directed to the compressor, and thus the amount of EGR directed to the engine.

Figure 8:
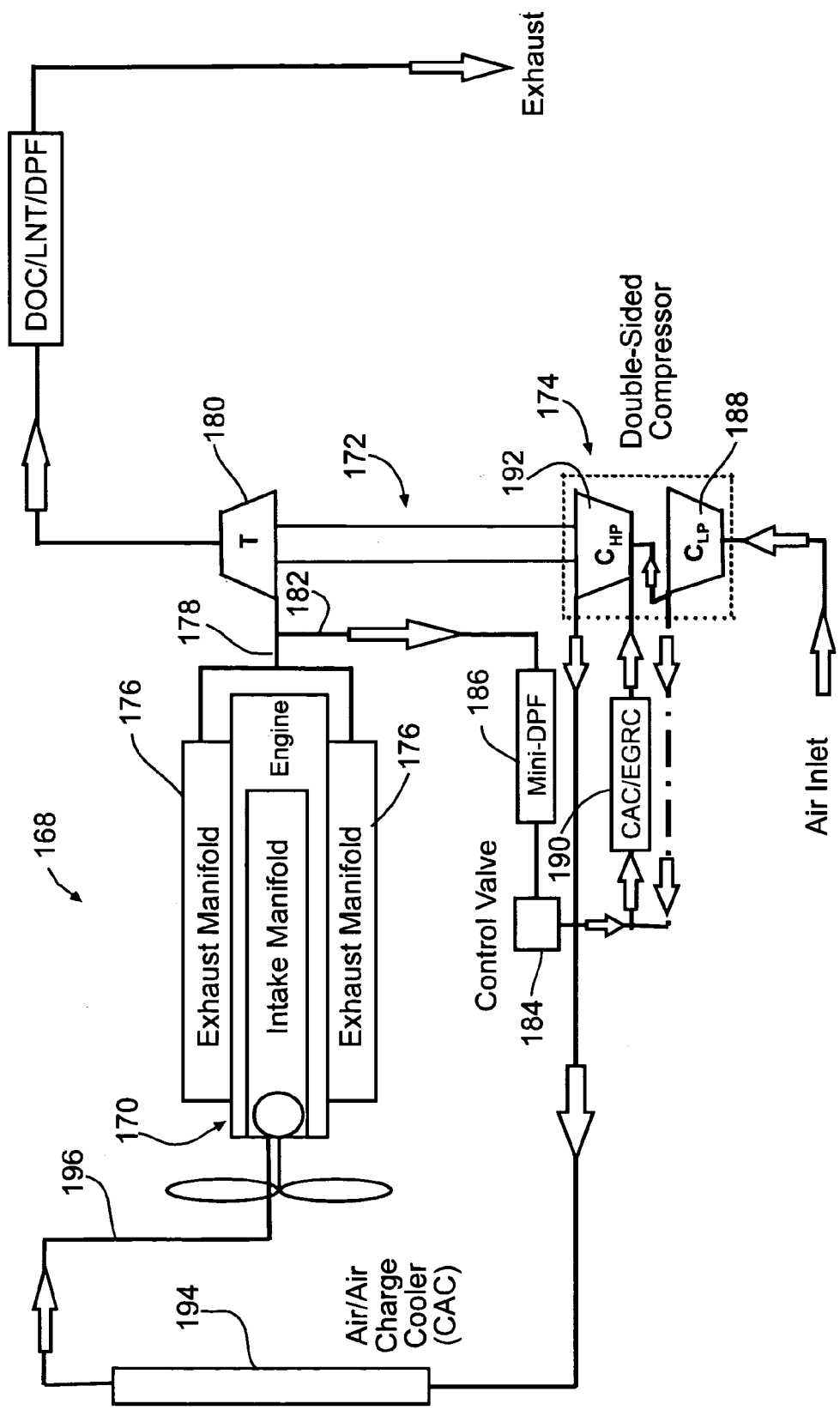
FIG. 8 is a schematic diagram illustrating a third embodiment hybrid EGR system, used with a turbocharger comprising a two-stage compressor, according to principles of the invention.

FIG. 8 illustrates a third embodiment EGR system 168 of this invention that is in many respects similar to that described above and illustrated in FIG. 6, except that it is used with engine 170 having a V-8 piston configuration, although any engine configuration will work with EGR system 168, and turbocharger 172 having two stage compressor 174. In this embodiment, the exhaust gas exiting the engine exhaust manifolds is split into first stream 178 that is directed to turbocharger turbine 180, and second stream 182 that is ultimately directed to turbocharger compressor 174 for EGR. Control valve 184 is disposed within second stream 182 downstream from exhaust after-treatment 186, e.g., a diesel particulate filter. Exhaust gas exiting the control valve is mixed with pressurized intake air, produced from compressor first stage 188, and is then cooled via charge air/EGR cooler 190. The cooled exhaust gas and charge air is then directed into the inlet of a compressor second stage 192 for pressurizing as desired for introduction into the engine. Charge air cooler 194 is positioned downstream of the compressor second stage for cooling the mixed pressurized air and exhaust gas before being introduced, via EGR stream 196, into the engine for combustion. The embodiment illustrated is that of a low speed turbocharger, high-pressure-loop EGR configuration. In this particular embodiment, EGR stream 194 is provided in the form of pressurized intake air mixture and the amount of EGR is controlled by control valve 184.

Figure 9:
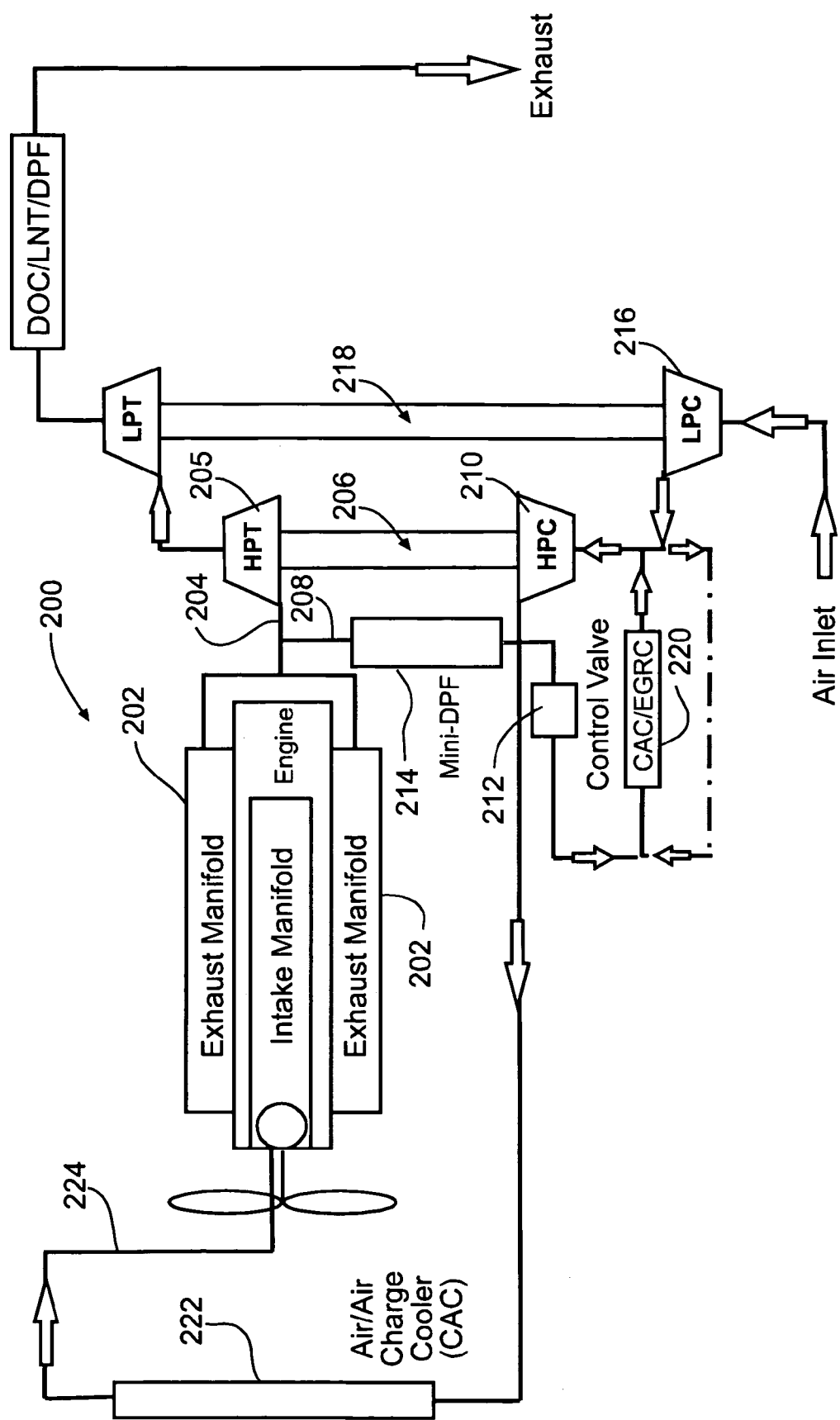
FIG. 9 is schematic diagram illustrating a fourth embodiment hybrid EGR system, used with turbochargers operated in a serial arrangement, according to principles of the invention.

FIG. 9 illustrates a fourth embodiment EGR system 200 of this invention that is in many respects similar to that described above and illustrated in FIG. 8, except that it is used with more than one turbocharger in a serial arrangement. In this embodiment, the exhaust gas exiting engine exhaust manifolds 202 is split into first stream 204 that is directed to turbine 205 of high pressure turbocharger 206, and second stream 208 that is ultimately directed to compressor section 210 of high pressure turbocharger 206 for EGR. Control valve 212 is disposed within second stream 208 downstream from exhaust after-treatment 214, e.g., a diesel particulate filter. Exhaust gas exiting the control valve is mixed with pressurized intake air, produced from compressor section 216 of low pressure turbocharger 218, and is then cooled via charge air/EGR cooler 220. The cooled exhaust gas and charge air is then directed into inlet of high pressure turbocharger compressor 210 for pressurizing as desired for introduction into the engine. Charge air cooler 222 is positioned downstream of high pressure turbocharger compressor 210 for cooling the mixed further pressurized air and exhaust gas before being introduced, via EGR stream 224, into the engine for combustion. The embodiment illustrated is that of a series turbocharger, high-pressure-loop EGR configuration. In this particular embodiment, EGR stream 224 is provided in the form of pressurized intake air mixture and the amount of EGR is controlled by control valve 212.

Figure 10:
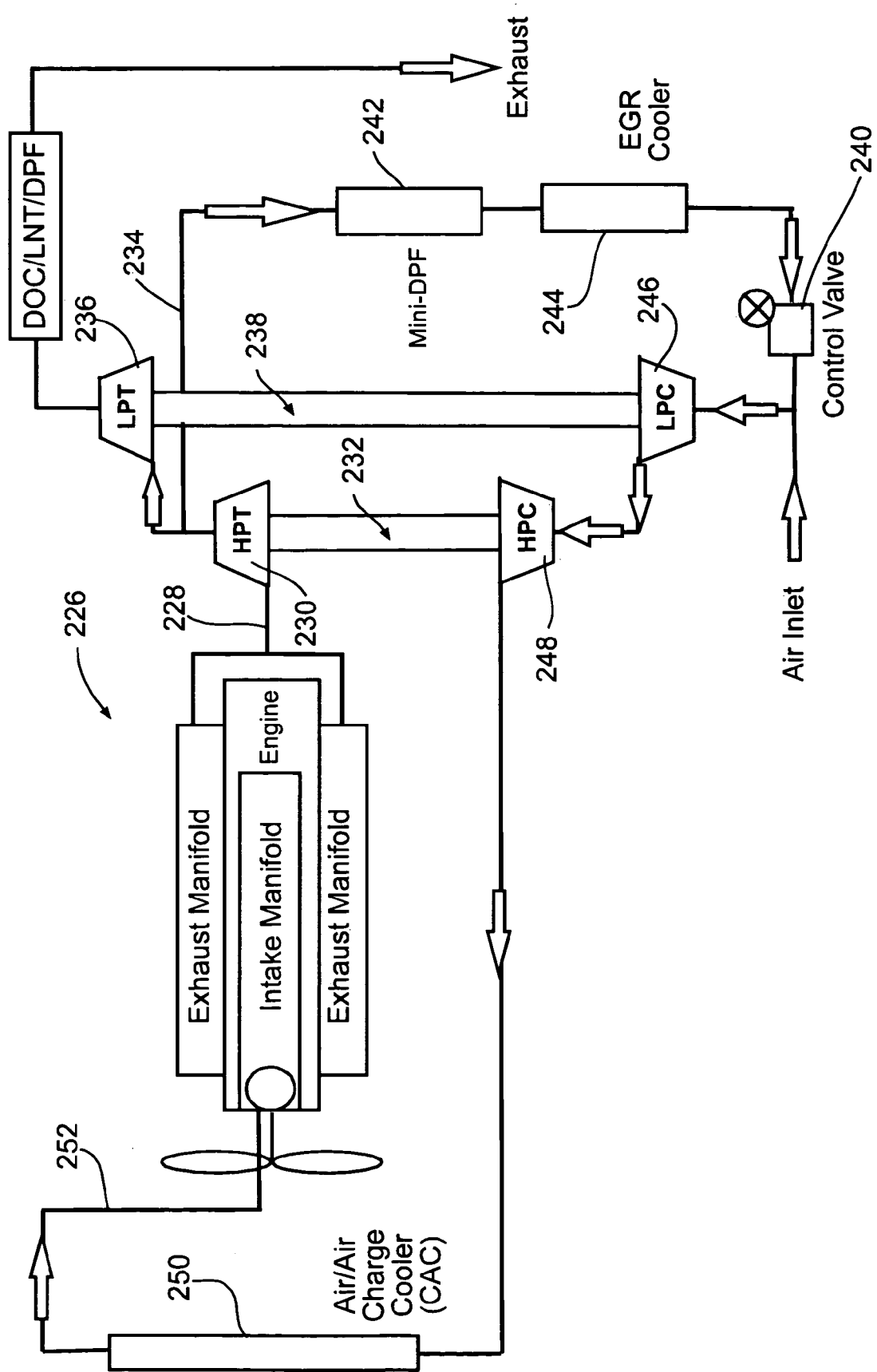
FIG. 10 is a schematic diagram illustrating a fifth embodiment hybrid EGR system, used with turbochargers operated in a serial arrangement, according to principles of the invention.

FIG. 10 illustrates a fifth embodiment EGR system 226 of this invention that is in many respects similar to that described above and illustrated in FIG. 9 in that it involves the use of multiple turbochargers positioned in a serial arrangement. In this particular embodiment, however, engine exhaust 228 is routed directly to turbine section 230 of high pressure turbocharger 232, and EGR bypass stream 234 is taken between the turbine exhaust outlet of the first turbocharger and turbine section 236 exhaust inlet of second turbocharger 238. Control valve 240 is positioned with EGR bypass stream 234 downstream of exhaust after-treatment 242, e.g., a diesel particulate filter, and EGR cooler 244. Exhaust gas exiting valve 240 is mixed with inlet air before being introduced into the inlet of compressor section 246 of low pressure turbocharger 238. Pressurized air and exhaust gas exiting compressor section 246 of pressure turbocharger 238 is introduced into the inlet of compressor section 248 of high pressure turbocharger 232 for pressurizing to a desired amount for introduction into the engine. Charge air cooler 250 is positioned downstream of high pressure turbocharger compressor 248 for cooling the mixed further pressurized air and exhaust gas before being introduced, via EGR stream 252, into the engine for combustion. The embodiment illustrated is that of a series turbocharger, hybrid low pressure loop EGR configuration. In this particular embodiment, EGR stream 252 is provided in the form of pressurized intake air mixture and the amount of EGR is controlled by control valve 240.

Figure 11:
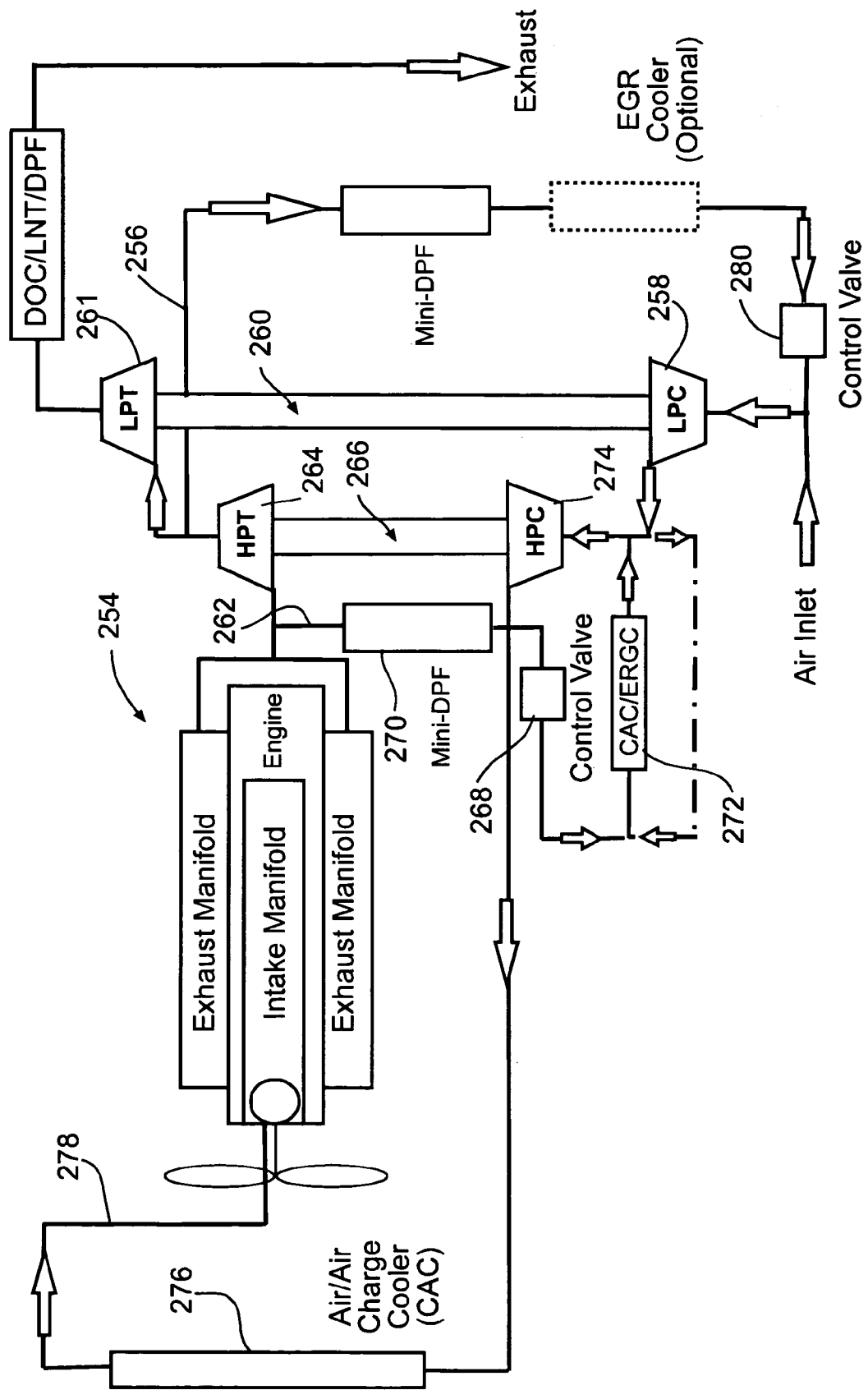
FIG. 11 is a schematic diagram illustrating a first embodiment dual hybrid EGR system, used with turbochargers operated in a serial arrangement, according to principles of the invention.

FIG. 11 illustrates a first embodiment dual hybrid EGR system 254 of this invention that is in many respects similar to that described above and illustrated in FIG. 9 in that it involves the use of multiple turbochargers positioned serially, and involves the use of EGR bypass stream 262 for introducing exhaust gas into compressor section 274 of high pressure turbocharger 266. This embodiment differs, however, in that it also includes another EGR bypass stream 256 that is taken before entering turbine section 261 of low pressure turbocharger 260. Because EGR bypass stream 256 is taken downstream of high pressure turbocharger turbine section 264, for introduction into compressor section 258 of low pressure turbocharger 260, it is referred to as a low pressure section of the EGR loop. The other EGR bypass stream 262 includes control valve 268 positioned downstream of exhaust after-treatment 270, e.g., a diesel particulate filter, and charge air/EGR cooler 272. Exhaust gas exiting valve 268 is mixed with a pressurized mixture of air and exhaust gas from EGR bypass stream 256 produced by low pressure turbocharger compressor 258 before being introduced into the inlet of compressor section 274 of high pressure turbocharger 266. Because EGR bypass stream 262 is taken before entry into high pressure turbocharger turbine 264, it is referred to as a high pressure section of the EGR loop. Pressurized air and exhaust gas exiting compressor 274 of high pressure turbocharger 266 is passed through charge air cooler 276 for cooling the further pressurized air and exhaust gas mixture before being introduced, via fresh air/EGR mixture stream 278, into the engine for combustion. The embodiment illustrated involves the use of series turbochargers, and is referred to as being a dual hybrid system in that it includes two EGR loops, i.e., a high pressure loop and a low pressure loop, and because it involves the introduction of exhaust gas for EGR purposes into one or more turbocharger compressors. Thus, this EGR system embodiment can be referred to as a dual hybrid high pressure and hybrid low pressure loop EGR system. In this particular embodiment, EGR stream 278 is provided in the form of pressurized intake air mixture and the amount of EGR provided via the low pressure loop is controlled by control valve 280, while the amount of EGR provided via the high pressure loop is controlled by control valve 268.

Figure 12:
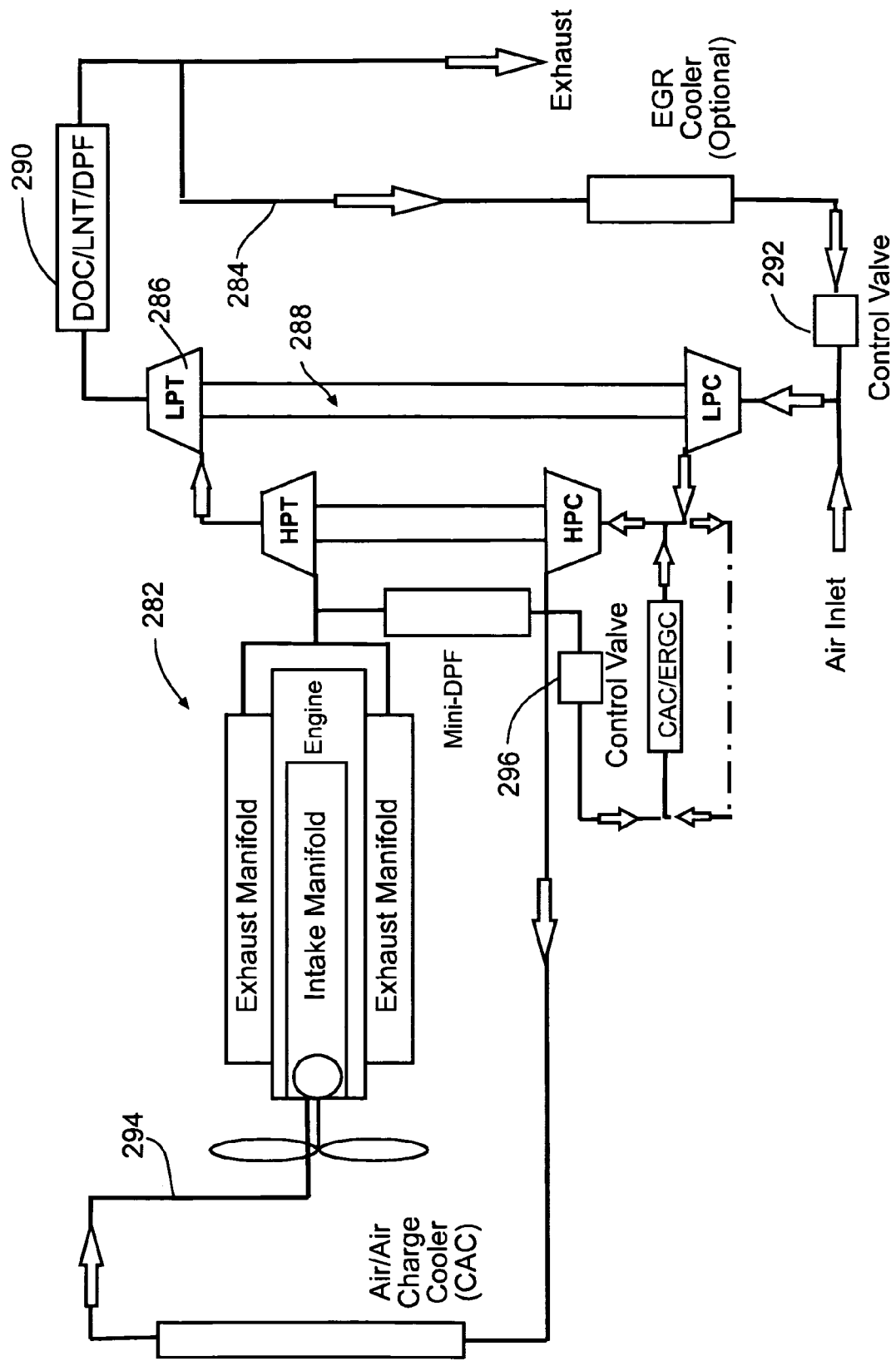
FIG. 12 is a schematic diagram illustrating a second embodiment dual hybrid EGR system, used with turbochargers operated in a serial arrangement, according to principles of the invention.

FIG. 12 illustrates a second embodiment dual hybrid EGR system 282 of this invention that is in many respects similar to that described above and illustrated in FIG. 11 in that it involves the use of multiple turbochargers positioned serially, and involves the use both high pressure and low pressure EGR loops. This embodiment differs, however, in that the low pressure EGR loop is provided in the form of EGR bypass stream 284 that is taken downstream from turbine section 286 of low pressure turbocharger 288, and downstream from exhaust after-treatment 290. EGR bypass 284 includes control valve 292 that is positioned upstream of a compressor section of low pressure turbocharger 288. The high pressure EGR loop is identical to the embodiment described above and illustrated in FIG. 11. The embodiment illustrated involves the use of series turbochargers, and is referred to as being a dual hybrid system in that it includes two EGR loops, i.e., a high pressure loop and a low pressure loop, and because it involves the introduction of exhaust gas for EGR purposes into one or more turbocharger compressors. Thus, this EGR system embodiment can be referred to as a dual hybrid high pressure and hybrid low pressure loop EGR system. In this particular embodiment, EGR stream 294 is provided in the form of pressurized intake air mixture and the amount of EGR provided via the low pressure loop is controlled by control valve 292, while the amount of EGR provided via the high pressure loop is controlled by control valve 296.

Figure 13:
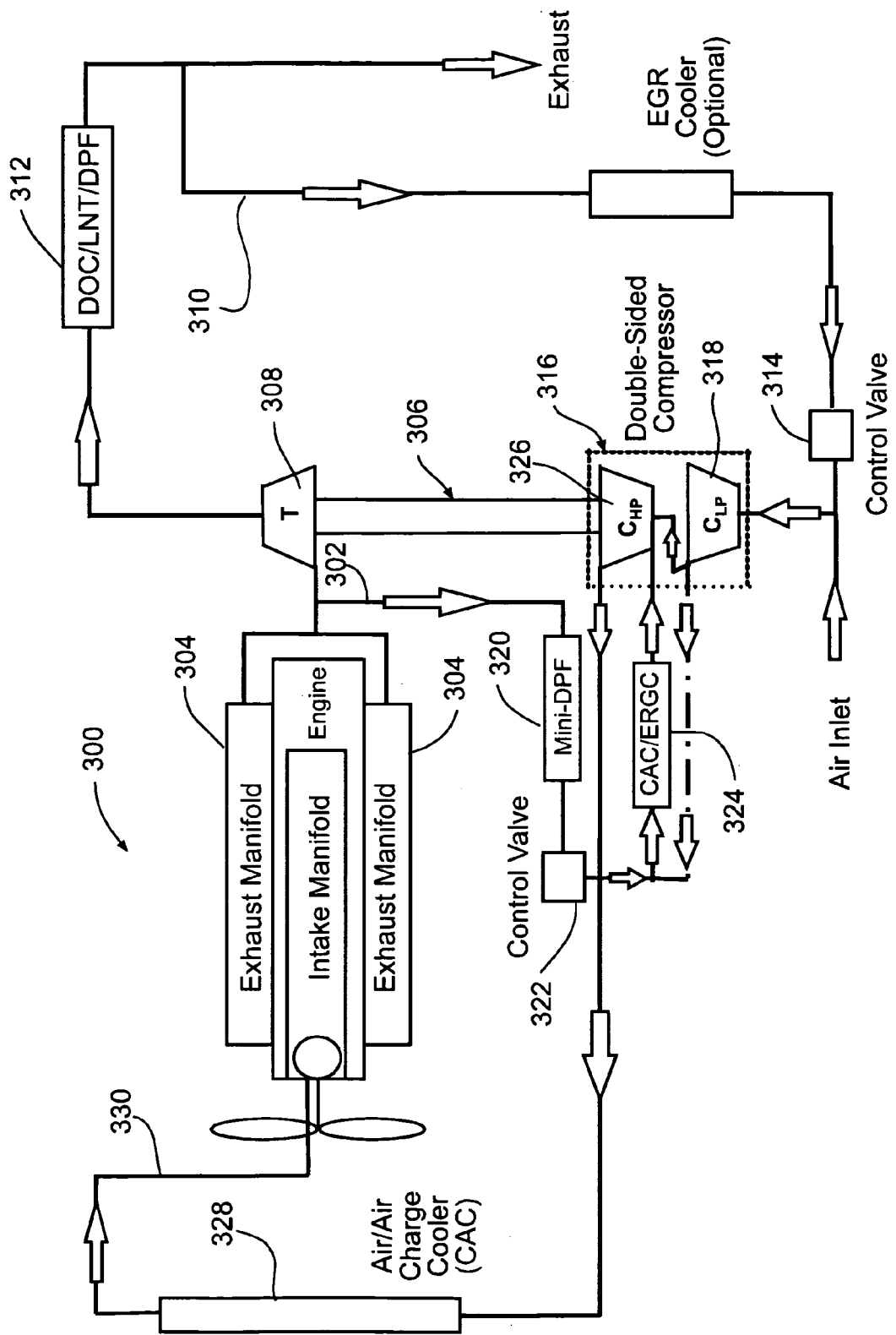
FIG. 13 is a schematic diagram illustrating a third embodiment dual hybrid EGR system, used with a turbocharger comprising a two-stage compressor, according to principles of the invention.

FIG. 13 illustrates a third embodiment dual hybrid EGR system 300 of this invention that involves the use of low and high pressure EGR loops in a single turbocharger application. In this embodiment, EGR bypass stream 302 is taken from engine exhaust manifolds 304 upstream from turbocharger turbine section 308, and forms part of the high pressure EGR loop. Another EGR bypass stream 310 is taken downstream from turbine section 308, and downstream from exhaust after-treatment 312. EGR bypass 310 includes control valve 314 that is positioned upstream of turbocharger compressor section 316. In this embodiment, the turbocharger comprises a two stage compressor (including either a double sided compressor or two separate compressors) similar to that illustrated in FIG. 8. Exhaust gas exiting valve 314 is mixed with air before being introduced into an inlet of first (low pressure) compressor stage 318. Exhaust gas in EGR bypass stream 302 is passed through exhaust after-treatment 320, e.g., diesel particulate filter and to control valve 322 before being mixed with pressurized air and exhaust exiting turbocharger first compressor stage 318. The mixed exhaust gas from EGR bypass stream 302 and the pressurized air is cooled by EGR charge air cooler 324 before being introduced into an inlet of second (high pressure) compressor stage 326. The mixture of pressurized air and exhaust gas exits the second stage compressor and is routed through a charge air cooler before being introduced into the engine via EGR stream 330. The example embodiment illustrated is referred to as being a dual hybrid system in that it includes two EGR loops, i.e., a high pressure loop and a low pressure loop, and because it involves the introduction of exhaust gas for EGR purposes into between the compressor stages of a multi-compressor stage turbocharger. Thus, this EGR system embodiment can be referred to as a dual hybrid high pressure and hybrid low pressure loop EGR system. In this particular embodiment, EGR stream 330 is provided in the form of pressurized intake air mixture and the amount of EGR provided via the low pressure loop is controlled by control valve 314, while the amount of EGR provided via the high pressure loop is controlled by control valve 322.

Figure 14:
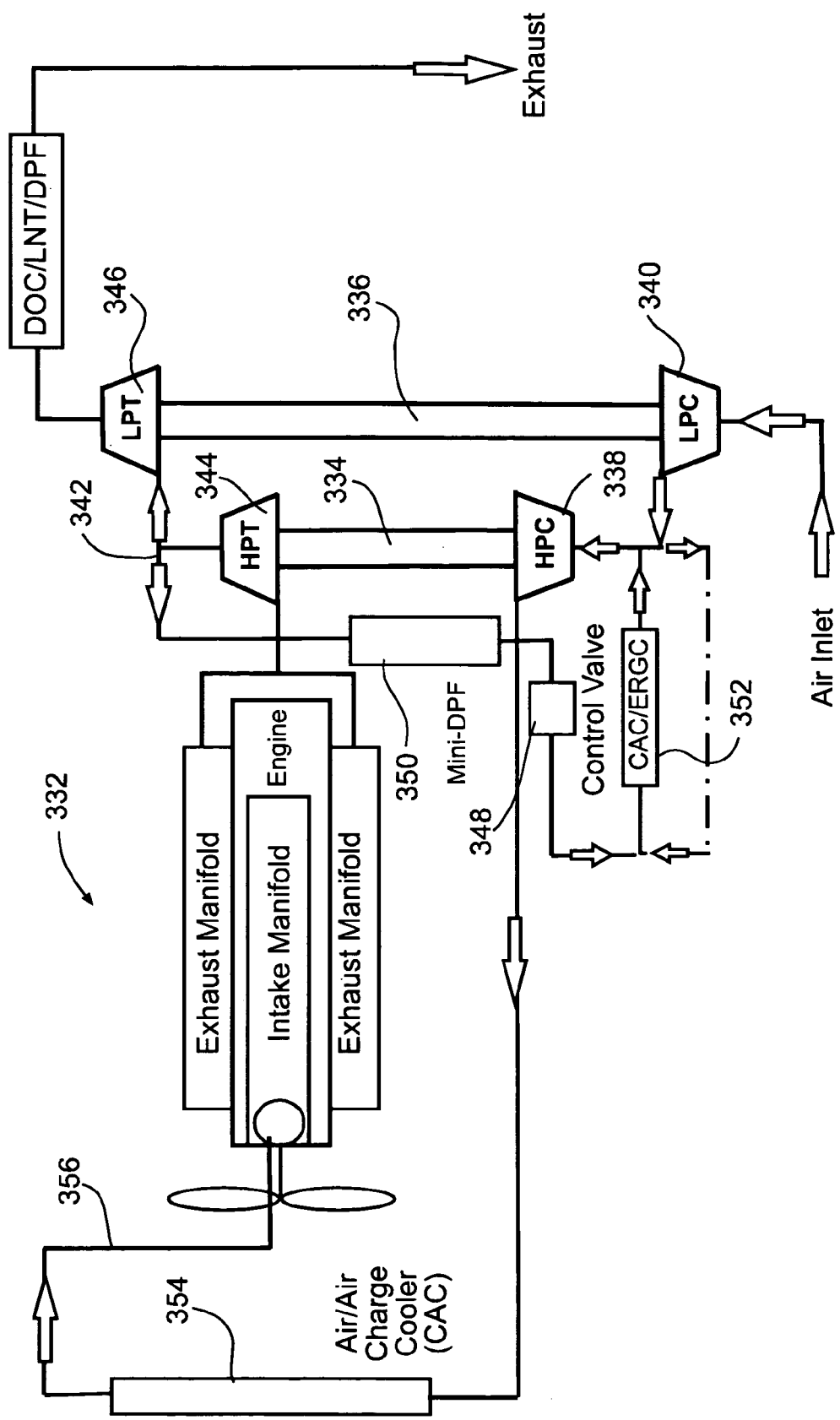
FIG. 14 is a schematic diagram illustrating a special embodiment hybrid EGR system, used with turbochargers operated in a serial arrangement, according to principles of the invention.

FIG. 14 illustrates a special embodiment intermediate pressure EGR system 332 of this invention. This embodiment is somewhat similar to that illustrated in FIG. 12 in that it involves the use of serially arranged turbochargers 334 and 336, and that it includes the introduction of exhaust gas between the two compressor sections 338 and 340 of respective turbochargers 334 and 336. However, this particular embodiment only includes a single EGR loop that is taken as exhaust bypass stream 342 downstream of high pressure turbocharger turbine 344 but upstream of low pressure turbocharger turbine 346. Control valve 348 is positioned within EGR bypass stream 342 downstream of exhaust after-treatment 350, e.g., a diesel particulate filter. Exhaust gas exiting valve 348 is mixed with pressurized air produced by (low pressure) compressor section 340 of low pressure turbocharger 336. The mixed pressurized air and exhaust gas is passed through charge air/EGR cooler 352 before being introduced into (high pressure) compressor section 338 of high pressure turbocharger 334. The mixture of pressurized air and exhaust gas exits compressor section 338 and is routed through charge air cooler 354 before being introduced into the engine via EGR stream 356. The embodiment illustrated is referred to as an intermediate pressure loop system, and because it involves taking an exhaust gas bypass stream at an intermediate pressure point between the two turbocharger turbines before being introduced between the turbocharger compressor stages. The intermediate pressure loop EGR system is still considered a hybrid in that it involves the introduction of exhaust gas between turbocharger compressors. In this particular embodiment, EGR stream 356 is provided in the form of pressurized intake air mixture and the amount of EGR that is provided is controlled by control valve 348.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An exhaust gas recirculation (EGR) system comprising:
an engine having an intake manifold and an exhaust manifold;
a turbocharger with at least one compressor stage;
a first exhaust gas bypass stream connected to receive exhaust gas upstream of the turbocharger;
a first control valve connected in the first exhaust gas bypass stream to control the amount of exhaust gas received from the exhaust manifold;
a second exhaust gas bypass stream connected to receive exhaust gas exiting the exhaust manifold through a turbine section of the turbocharger and combine the gas with an intake air stream to form an exhaust gas/air mixture that is directed into a first compressor stage of the turbocharger;
a second control valve connected within the second exhaust gas bypass stream upstream of a connection point with the intake air stream for controlling a relative amount of air and exhaust gas in the exhaust gas/air mixture routed to the first compressor stage of the turbocharger;
a second turbocharger operated in parallel with the turbocharger;
a bypass for directing a partial flow of exhaust exiting the exhaust manifold into an inlet of a turbine section of the second turbocharger and a first synchronized control valve to control said partial flow; and
a second synchronized control valve to control a relative amount of exhaust gas/air mixture entering compressor sections of the turbochargers;
wherein exhaust gas exiting the turbine section of the second turbocharger forms a part of the second exhaust gas bypass stream and the pressurized exhaust gas/air mixture exiting the compressor sections of the turbochargers is combined with the first exhaust gas bypass stream before being introduced into the intake manifold.

2. An exhaust gas recirculation (EGR) system comprising:
an engine having an intake manifold and an exhaust manifold;
a turbocharger with at least one compressor stage;
a first exhaust gas bypass stream connected to receive exhaust gas upstream of the turbocharger;
a first control valve connected in the first exhaust gas bypass stream to control the amount of exhaust gas received from the exhaust manifold;
a second exhaust gas bypass stream connected to receive exhaust gas exiting the exhaust manifold though a turbine section of the turbocharger and combine the gas with an intake air stream to form an exhaust gas/air mixture that is directed into a first compressor stage of the turbocharger;
a second control valve connected within the second exhaust gas bypass stream upstream of a connection point with the intake air stream for controlling a relative amount of air and exhaust gas in the exhaust gas/air mixture routed to the first compressor stage of the turbocharger; and
at least one exhaust after-treatment to treat the second exhaust gas bypass stream.

3. An exhaust gas recirculation (EGR) system comprising:
an engine having an intake manifold and an exhaust manifold;
a turbocharger with at least one compressor stage;
a first exhaust gas bypass stream connected to receive exhaust gas upstream of the turbocharger;
a first control valve connected in the first exhaust gas bypass stream to control the amount of exhaust gas received from the exhaust manifold;
a second exhaust gas bypass stream connected to receive exhaust gas exiting the exhaust manifold through a turbine section of the turbocharger and combine the gas with an intake air stream to form an exhaust gas/air mixture that is directed into a first compressor stage of the turbocharger; and
a second control valve connected within the second exhaust gas bypass stream upstream of a connection point with the intake air stream for controlling a relative amount of air and exhaust gas in the exhaust gas/air mixture routed to the first compressor stage of the turbocharger;
wherein the pressurized exhaust gas/air mixture exiting a last compressor stage of the turbocharger is combined with the first exhaust gas bypass stream before being introduced into the intake manifold.

4. The EGR system of claim 3 wherein the exhaust gas/air mixture is cooled before entering the last compressor stage.

5. The EGR system of claim 3 further comprising an EGR cooler to cool the first exhaust gas bypass stream.

6. An exhaust gas recirculation (EGR) system comprising:
an engine having an intake manifold and an exhaust manifold;
a turbocharger with at least one compressor stage;
a first exhaust gas bypass stream connected to receive exhaust gas upstream of the turbocharger;
a first control valve connected in the first exhaust gas bypass stream to control the amount of exhaust gas received from the exhaust manifold;
a second exhaust gas bypass stream connected to receive exhaust gas exiting the exhaust manifold through a turbine section of the turbocharger and combine the gas with an intake air stream to form an exhaust gas/air mixture that is directed into a first compressor stage of the turbocharger;
a second control valve connected within the second exhaust gas bypass stream upstream of a connection point with the intake air stream for controlling a relative amount of air and exhaust gas in the exhaust gas/air mixture routed to the first compressor stage of the turbocharger; and
an EGR cooler and a second compressor stage of the turbocharger, wherein the exhaust gas from the first exhaust gas bypass stream is cooled with the EGR cooler and mixed with the exhaust gas/air mixture to form a final gas/air mixture before said final gas/air mixture is directed into the second compressor stage of the turbocharger, and wherein the pressurized final gas/air mixture is introduced into the intake manifold.

7. The EGR system of claim 6 wherein the exhaust gas/air mixture is cooled after it is compressed by the first compressor stage.

8. The EGR system of claim 6 further comprising a diesel particulate filter to filter exhaust gas in the first exhaust gas bypass stream.

9. The EGR system of claim 6 further comprising an EGR cooler to cool the second exhaust gas bypass stream.

10. The EGR system of claim 6 further comprising a charge air cooler to cool the pressurized exhaust gas and air before they are introduced into the intake manifold.

11. An EGR system comprising:
an engine having art intake manifold and an exhaust manifold;
a pair of serially arranged turbochargers;
a first exhaust gas bypass stream connected to receive exhaust gas upstream of a first turbocharger;
a first control valve connected in the first exhaust gas bypass stream to control the amount of exhaust gas received from the exhaust manifold;
a second exhaust gas bypass stream connected to receive exhaust gas exiting the exhaust manifold through a turbine section of at least one turbocharger and combine the gas with an intake air stream to form an exhaust gas/air mixture that is directed into a compressor section of the second turbocharger; and
a second control valve connected within the second exhaust gas bypass stream upstream of a connection point with the intake air stream for controlling a relative amount of air and exhaust gas in the exhaust gas/air mixture routed to the compressor section of the second turbocharger;
wherein the pressurized exhaust gas/air mixture exiting the second turbocharger is directed to an inlet of a compressor section of the first turbocharger for further compression.

12. The EGR system of claim 11 further comprising a charge air cooler to cool the exhaust gas and air before they are introduced into the intake manifold.

13. The EGR system of claim 11 further comprising an EGR cooler to cool the second exhaust gas bypass stream.

14. The EGR system of claim 11 further comprising at least one exhaust after-treatment to treat the second exhaust gas bypass stream.

15. The EGR system of claim 11 wherein the exhaust gas/air mixture is cooled after it is compressed by the compressor section of the second turbocharger.

16. The EGR system of claim 11 wherein the second exhaust gas bypass stream is connected to receive exhaust gas exiting a turbine section of the first turbocharger.

17. The EGR system of claim 16 wherein the exhaust gas from the first exhaust gas bypass stream is cooled and mixed with the exhaust gas/air mixture before said mixture is directed to a compressor section of the first turbocharger to form a final gas/air mixture, and wherein the pressurized final gas/air mixture exiting the compressor section of the first turbocharger is introduced into the intake manifold.

18. The EGR system of claim 16 further comprising a diesel particulate filter to filter exhaust gas in the first exhaust gas bypass stream.

19. The EGR system of claim 11 wherein a turbine section of the second turbocharger receives exhaust gas exiting a turbine section of the first turbocharger and the second exhaust gas bypass stream is connected to receive exhaust gas exiling the turbine section of the second turbocharger.

20. The EGR system of claim 19 wherein the exhaust gas from the first exhaust gas bypass stream is cooled and mixed with the exhaust gas/air mixture before said mixture is directed to an inlet of a compressor section of the first turbocharger to form a final gas/air mixture, and wherein the pressurized final gas/air mixture exiting the compressor section of the first turbocharger is introduced into the intake manifold.

21. The EGR system of claim 20 further comprising a diesel particulate filter to filter exhaust gas in the first exhaust gas bypass stream.

22. The EGR system of claim 19 wherein the pressurized exhaust gas/air mixture exiting the compressor section of the first turbocharger is combined with the first exhaust gas bypass stream before being introduced into the intake manifold.

23. The EGR system of claim 22 further comprising an EGR cooler to cool the first exhaust gas bypass stream.

* * * * *